US006011141A

United States Patent [19]

Lamm et al.

[11] Patent Number: 6,011,141

[45] Date of Patent: Jan. 4, 2000

[54] ACID POLYAZO DYES

[75] Inventors: Gunther Lamm, Hassloch; Helmut Reichelt, Neustadt; Matthias Wiesenfeldt, Dannstadt-Schauernheim, all of Germany

[73] Assignee: BASF Aktiengesellschaft, Ludwigshafen, Germany

[21] Appl. No.: 09/091,360

[22] PCT Filed: Dec. 16, 1996

[86] PCT No.: PCT/EP96/05632

§ 371 Date: Jun. 19, 1998

§ 102(e) Date: Jun. 19, 1998

[87] PCT Pub. No.: WO97/24405

PCT Pub. Date: Jul. 10, 1997

[30] Foreign Application Priority Data

Dec. 27, 1995 [DE] Germany ........................... 195 48 785

[51] Int. Cl.[7] .......................... C09B 62/513; C09B 35/64

[52] U.S. Cl. .......................... 534/642; 534/755; 534/796; 534/805; 534/678; 534/680; 534/558

[58] Field of Search .................................... 534/642, 755, 534/796, 805

[56] References Cited

FOREIGN PATENT DOCUMENTS 557460 11/1943 United Kingdom .
578000 6/1946 United Kingdom .

*Primary Examiner*—Fiona T. Powers

*Attorney, Agent, or Firm*—Oblon, Spivak, McClelland, Maier & Neustadt, P. C.

[57] ABSTRACT

Polyazo dyes of the formula

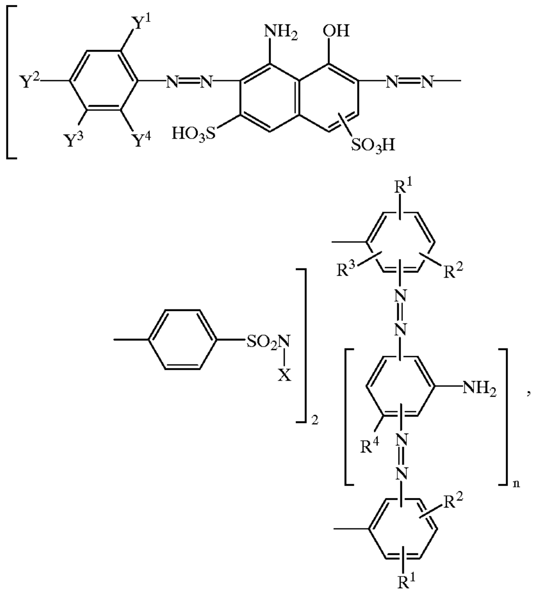

where n, $Y^1$, $Y^2$, $Y^3$, $Y^4$, X, $R^1$, $R^2$ and $R^3$ are each as defined in more detail in the description are useful for dyeing natural or synthetic substrates.

10 Claims, No Drawings

ACID POLYAZO DYES

The present invention relates to novel polyazo dyes of the formula I (I)

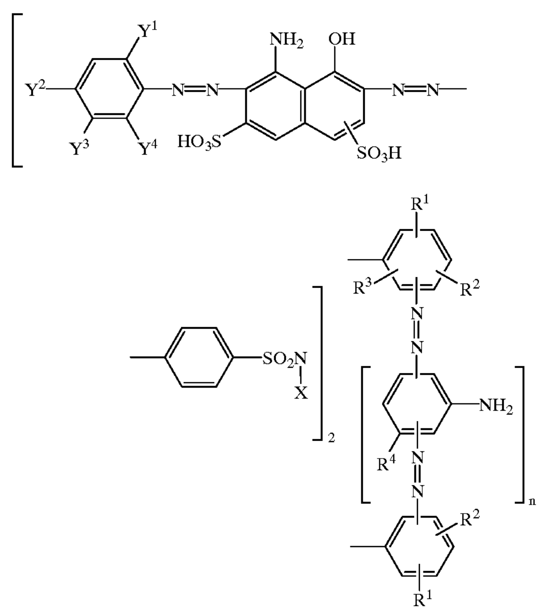

where n is 0 or 1, $Y^1$ is hydrogen, hydroxysulfonyl, pyrrolidinylsulfonyl, piperidinylsulfonyl, morpholinylsulfonyl or $SO_2$—Alk, $SO_2$—Ar, $SO_2$—N(Alk)$_2$, $SO_2$—N (Alk)Ar, $SO_2$—OAr, $SO_2$—$C_2H_4$—Q, $SO_2$—CH═$CH_2$, $SO_2$—$CH_2$CH═$CH_2$, CO—Ar,

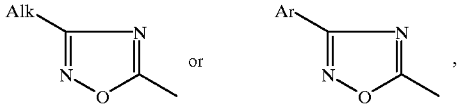

$Y^2$ is nitro, $SO_2$—NHAr or $Y^1$, $Y^3$ is hydrogen, hydroxysulfonyl, pyrrolidinylsulfonyl, piperidinylsulfonyl, morpholinylsulfonyl or a radical of the formula $SO_2$—Alk, $SO_2$—N(Alk)$_2$, $SO_2$—NHAlk, $SO_2$—$CH_2$COOH, $SO_2$—$C_2H_4$—Q, $SO_2$—CH═$CH_2$, $SO_2$—$CH_2$CH═$CH_2$, CO—Ar or CO—NHAlk or $Y^3$ and $Y^2$ together are L—NZ—CO, $Y^4$ is hydrogen, or $Y^4$ and $Y^3$ together are L—NZ—CO, X is hydrogen or $C_1$–$C_4$-alkyl, $R^1$ is hydrogen, $C_1$–$C_4$-alkyl, halogen, carboxyl, $C_1$–$C_4$-alkoxycarbonyl or hydroxysulfonyl, $R^2$ is hydrogen, $C_1$–$C_4$-alkyl, halogen, carboxyl or $C_1$–$C_4$-alkoxycarbonyl, or $R^2$ and $R^1$ together are L—NZ—CO, $R^3$ is hydrogen, hydroxyl, $C_1$–$C_4$-alkoxy, $C_1$–$C_4$-alkanoyloxy or benzoyloxy, and $R^4$ is amino or hydroxyl, where Alk is $C_1$–$C_8$-alkyl which can be interrupted by 1–3 oxygens in ether function or by sulfur or sulfonyl and can be substituted by hydroxyl, $C_1$–$C_4$-alkanoyloxy, benzoyloxy, sulfato, halogen, cyano, carboxyl or phenyl, Ar is phenyl which can be substituted by $C_1$–$C_4$-alkyl, $C_1$–$C_4$-alkoxy, halogen, carboxyl, $C_1$–$C_4$-alkanoylamino or hydroxysulfonyl, L is methylene or carbonyl, Z is hydrogen, naphthyl, $C_5$–$C_8$-cycloalkyl, Alk or Ar, and Q is hydroxyl or a group which can be eliminated under alkaline conditions, and also to their use for dyeing natural or synthetic substrates.

It is an object of the present invention to provide novel polyazo-class acid dyes having advantageous performance properties.

We have found that this object is achieved by the above-defined polyazo dyes of the formula I.

$R^1$, $R^2$, X, $Y^1$, $Y^2$, $Y^3$ and $Y^4$ are each present twice independently in the above formula I, and can therefore be identical or different at each occurrence.

If $Y^2$ and $Y^3$ or $Y^3$ and $Y^4$ together are L—NZ—CO, this radical can at each occurrence be attached either via L or via CO to the ring positions of $Y^2$, $Y^3$ and $Y^4$.

Any alkyl in formula I can be either straight-chain or branched.

Any substituted alkyl radical in formula I generally has one or two substituents.

Any alkyls in the above formulae which are interrupted by oxygens in ether function preferably comprise one or two such oxygens.

Any substituted phenyls in the above formulae generally have 1–3 substituents.

$R^1$, $R^2$, X and Alk are each for example methyl, ethyl, propyl, isopropyl, butyl, isobutyl, sec-butyl or tert-butyl.

Further examples of Alk are pentyl, isopentyl, neopentyl, tert-pentyl, hexyl, 2-methylpentyl, heptyl, 1-ethylpentyl, octyl, 2-ethylhexyl, isooctyl (which is a trivial name derived from the alcohols obtained by oxo synthesis—cf. Ullmann's Encyclopedia of Industrial Chemistry, 5th Edition, Vol. A 1, 290–293, and Vol. A 10, 284 and 285), 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl, 3,6,9-trioxaundecyl, 2-methylthioethyl, 2-ethylthioethyl, 2- or 3-methylthiopropyl, 2- or 3-ethylthiopropyl, 2- or 4-methylthiobutyl, 2- or 4-ethylthiobutyl, 2-methylsulfonylethyl, 2-ethylsulfonylethyl, 2- or 3-methylsulfonylpropyl, 2- or 3-ethylsulfonylpropyl, 2- or 4-methylsulfonylbutyl, 2- or 4-ethylsulfonylbutyl, chloromethyl, 2-chloroethyl, 2- or 3-chloropropyl, benzyl, 1- or 2-phenylethyl, 3-benzyloxypropyl, 2-hydroxyethyl, 2- or 3-hydroxypropyl, cyanomethyl, 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, carboxylmethyl, 2-carboxylethyl, 2- or 3-carboxylpropyl,-2-sulfatoethyl or 2- or 3-sulfatopropyl.

Further examples of $R^1$ and $R^2$ are fluorine, chlorine, bromine, methoxycarbonyl, ethoxycarbonyl, propoxycarbonyl, isopropoxycarbonyl or butoxycarbonyl.

Examples of Ar are phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl, 2,4-dimethoxyphenyl, 2-, 3- or 4-formylaminophenyl, 2-, 3- or 4-acetylaminophenyl, 2-, 3- or 4-propionylaminophenyl, 2-, 3- or 4-chlorophenyl, 2-, 3- or 4-carboxyphenyl or 2-, 3- or 4-hydroxysulfonylphenyl.

Examples of Z are cyclopentyl, cyclohexyl, cycloheptyl and cyclooctyl.

Examples of $R^3$ are methoxy, ethoxy, propoxy, isopropoxy, butoxy, isobutoxy, sec-butoxy, formyloxy, acetyloxy, propionyloxy, butyryloxy and isobutyryloxy.

Q is hydroxyl or a group which can be eliminated under alkaline conditions, for example chlorine, bromine, $C_1$–$C_4$-alkylsulfonyl, phenylsulfonyl, $OSO_3H$, $SSO_3H$, $OP(O)(OH)_2$, $C_1$–$C_4$-alkylsulfonyloxy, phenylsulfonyloxy, $C_1$–$C_4$-alkanoyloxy, $C_1$–$C_4$-dialkylamino or a radical of the formula

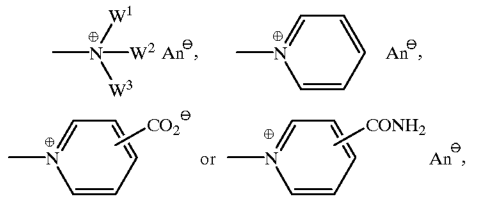

where $W^1$, $W^2$ and $W^3$ are identical or different and independently are each $C_1$–$C_4$-alkyl or benzyl and each An⊖ is one equivalent of an anion. Examples of suitable and possible anions in this context are fluoride, chloride, bromide, iodide, mono-, di- and trichloroacetate, methylsulfonate, phenylsulfonate and 2- or 4-methylphenylsulfonate.

Examples of $Y^1$ are N-phenyl-N-methylsulfamoyl, N-phenyl-N-ethylsulfamoyl, N-phenyl-N-propylsulfamoyl, N-phenyl-N-butylsulfamoyl, 3-methyl-, 3-ethyl-, 3-propyl-, 3-butyl- or 3-phenyl-1,2,4-oxadiazol-5-yl, phenoxysulfonyl, 2-, 3- or 4-methylphenoxysulfonyl, phenylsulfonyl, 2-, 3- or 4-methylphenylsulfonyl or 2,3-, 2,4-, 2,5-, 2,6-, 3,4- or 3,5-dimethylphenylsulfonyl.

Examples of $Y^3$ and additional examples of $Y^1$ are dimethylsulfamoyl, diethylsulfamoyl, dipropylsulfamoyl, dibutylsulfamoyl, N-methyl-N-ethylsulfamoyl, bis(2-hydroxyethyl)sulfamoyl, bis(carboxymethyl)sulfamoyl, bis(2-carboxyethyl)sulfamoyl, methylsulfonyl, ethylsulfonyl, propylsulfonyl, isopropylsulfonyl, butylsulfonyl, 2-hydroxyethylsulfonyl, 2-chloroethylsulfonyl, 2-sulfatoethylsulfonyl, benzoyl-, 2-, 3- or 4-methylbenzoyl or 2,3-, 2,4-, 2,5-, 2,6-, 3,4- or 3,5-dimethylbenzoyl.

Further examples of $Y^3$ are methylsulfamoyl, ethylsulfamoyl, propylsulfamoyl, isopropylsulfamoyl, butylsulfamoyl, 2-hydroxyethylsulfamoyl, carboxymethylsulfamoyl, 2-carboxyethylsulfamoyl, methylcarbamoyl, ethylcarbamoyl, propylcarbamoyl, isopropylcarbamoyl, butylcarbamoyl, 2-hydroxyethylcarbamoyl, carboxymethylcarbamoyl and 2-carboxyethylcarbamoyl.

Examples of $Y^2$ are phenylsulfamoyl and 2-, 3- or 4-methylphenylsulfamoyl.

Each

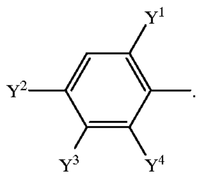

is, for example, of the formulae

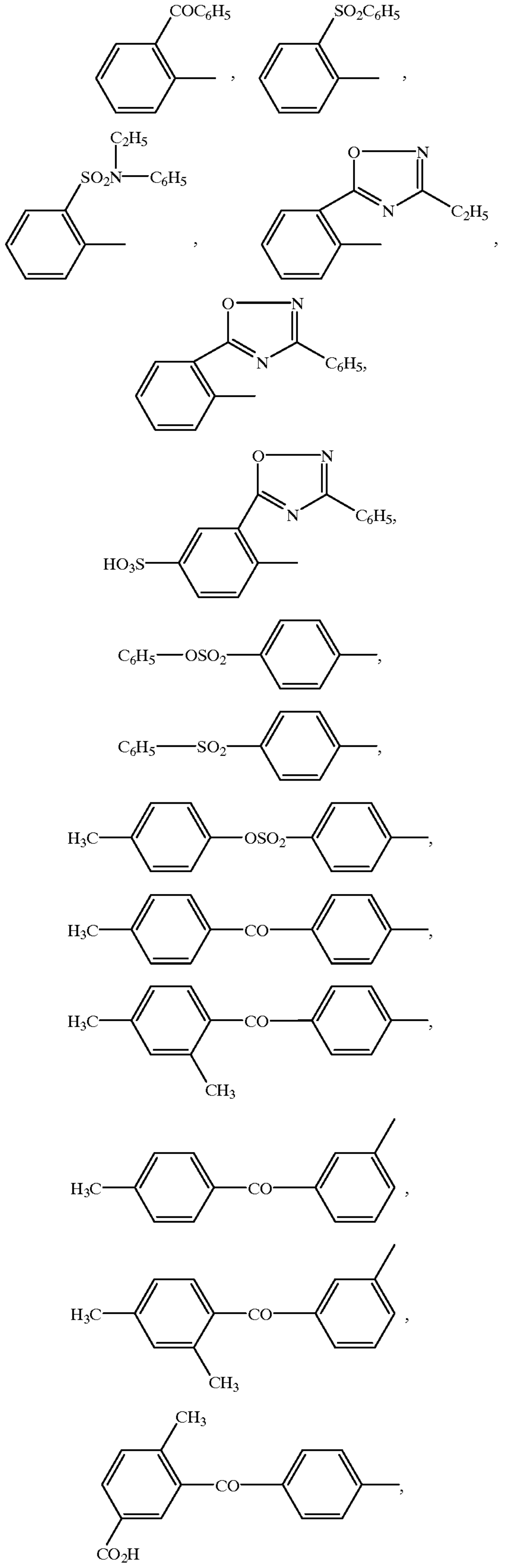

-continued

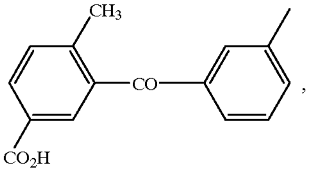

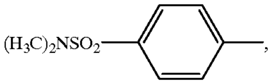

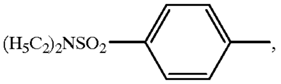

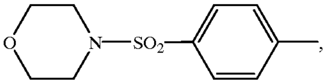

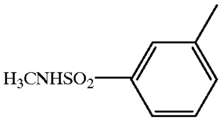

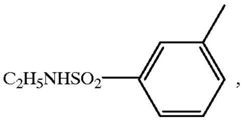

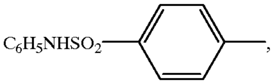

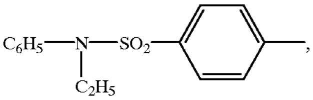

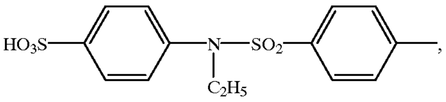

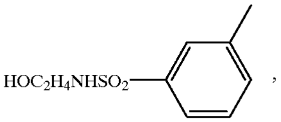

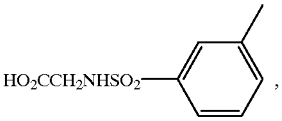

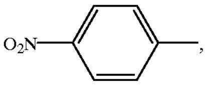

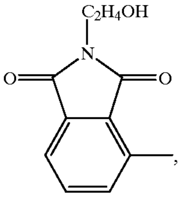

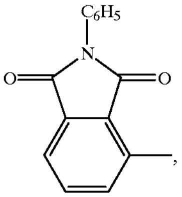

-continued

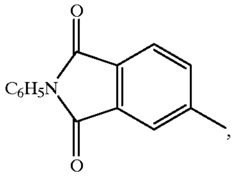

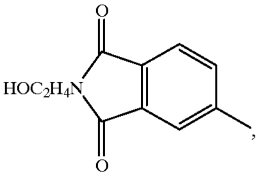

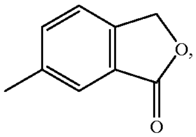

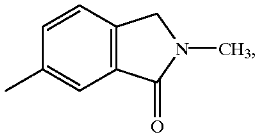

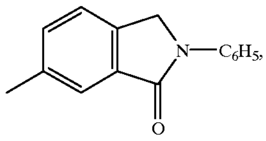

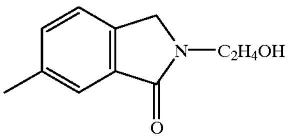

or

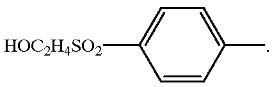

Since the polyazo dyes of the formula I comprise a plurality of hydroxysulfonyl groups, the invention also embraces the salts thereof.

Suitable salts in this context are metal salts or ammonium salts, the former being, in particular, lithium, sodium or potassium salts. Ammonium salts in the context of the invention mean salts having either unsubstituted or substituted ammonium cations. Examples of the latter are mono-, di-, tri-, tetra- or benzyltri-alkylammonium cations or those derived from N-containing five- or six-membered saturated heterocycles, such as pyrrolidinium, piperidinium, morpholinium or piperazinium cations or their N-monoalkyl- or N,N-dialkyl-substituted products. Alkyl in this case is generally straight-chain or branched $C_1$–$C_{20}$-alkyl which can be mono- or disubstituted by OH and/or interrupted by 1-4 oxygens in ether function.

Preference is given to polyazo dyes of the formula Ia (Ia)

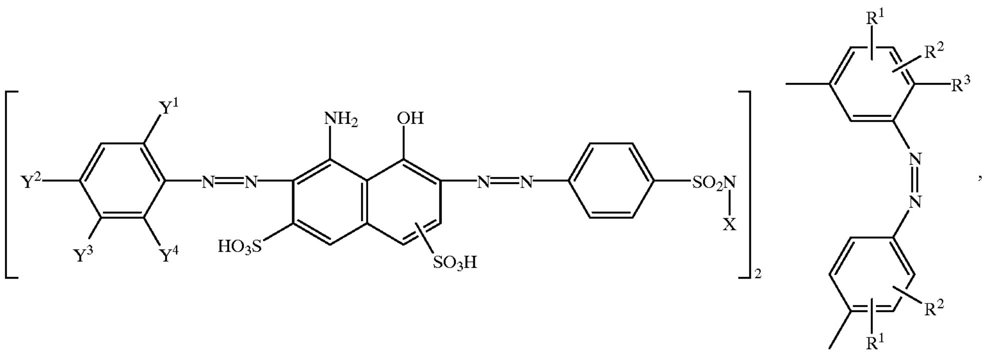

where $Y^1$, $Y^2$, $Y^3$, $Y^4$, X, $R^1$, $R^2$ and $R^3$ are each as defined above.

Preference is further given to polyazo dyes of the formula Ib where each Ar is as defined above, and to those where $Y^2$ is hydrogen, hydroxysulfonyl, nitro or $SO_2$—N(Alk)2, $SO_2$—$C_2H_4$—Q or $SO_2$—CH═$CH_2$, where Alk and Q are each as defined above, and to those in which $Y^3$ is hydrogen, (Ib)

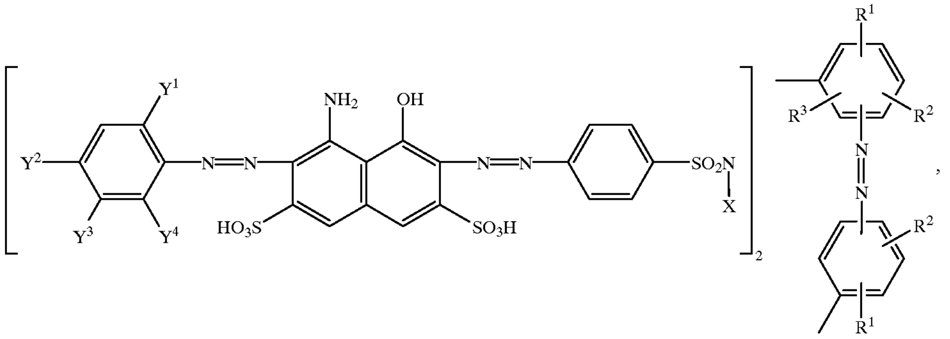

where $Y^1$, $Y^2$, $Y^3$, $Y^4$, X, $R^1$, $R^2$ and $R^3$ are each as defined above.

Preference is further given to polyazo dyes of the formula I where $R^1$ and $R^2$ are each hydrogen, and to those where $Y^1$ is hydrogen, hydroxysulfonyl or

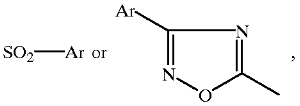

hydroxysulfonyl or $SO_2$—$C_2H_4$—Q or $SO_2$—CH═$CH_2$ or $Y^3$ and $Y^2$ together are L—NZ—CO, where L, Q and Z are each as defined above, and to those in which Z is unsubstituted or OH-substituted $C_1$–$C_4$-alkyl or is phenyl.

Particular preference is given to polyazo dyes of the formula I where X is hydrogen, and to those where $R^3$ is hydroxyl.

Very particular preference is given to polyazo dyes of the formula I where $R^1$ and $R^2$ are each hydrogen and $R^3$ is hydroxyl.

Of particular technical interest are polyazo dyes of the formula Ic (Ic)

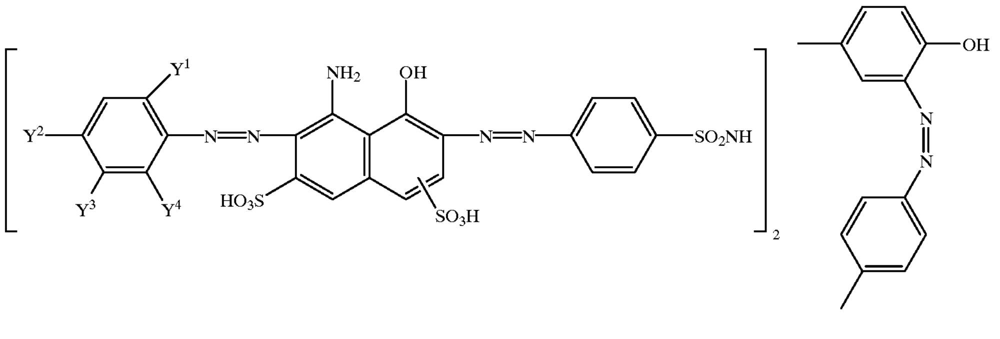

where $Y^1$, $Y^2$, $Y^3$ and $Y^4$ are each as defined above.

Preference is furthermore given to polyazo dyes of the formula I where the substituents are selected from a combination of the preferred ones above.

The novel polyazo dyes of the formula I can be obtained by methods known per se; those where n is 0, for example, by first diazotizing an aniline of the formula II (II)

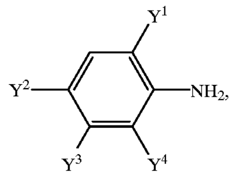

(IVa)

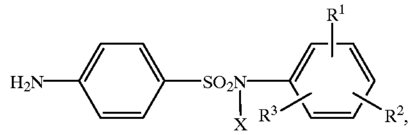

where $R^1$, $R^2$, $R^3$ and X are each as defined above, to give disazo dyes of the formula V (V)

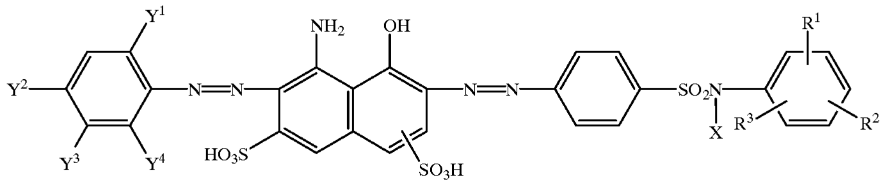

where $Y^1$, $Y^2$, $Y^3$ and $Y^4$ are each as defined above, and coupling the resulting diazonium salt with 1-amino-8-hydroxynaphthalene-3,5- or -3,6-disulfonic acid.

The resulting monoazo dye of the formula III (III)

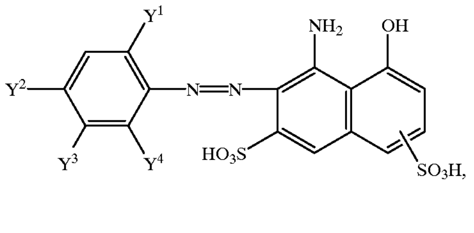

where $Y^1$, $Y^2$, $Y^3$ and $Y^4$ are each as defined above, can then be coupled, again in a manner known per se, with a diazonium salt that can be obtained by conventional diazotization of a sulfonyl compound of the formula IVa where $R^1$, $R^2$, $R^3$, yl, $Y^2$, $Y^3$, $Y^4$ and X are each as defined above.

In a further reaction the tetrazonium salt that can be obtained by conventional tetrazotization of a sulfonyl compound of the formula IVb (IVb)

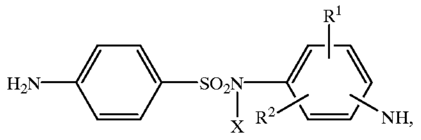

where $R^1$, $R^2$ and X are each as defined above, can be coupled first with the monoazo dye III and then with the disazo dye V, to give the polyazo dyes of the formula I.

To prepare dyes I where n is 1 it is possible, for example, to couple the tetrazonium salt obtainable by conventional tetrazotization of a sulfonyl compound of the formula IVc (IVc)

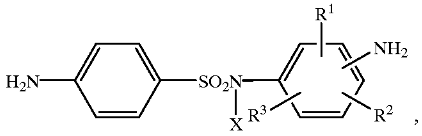

where $R^1$, $R^2$, $R^3$ and X are each as defined above, first with the monoazo dye III and then with an amine of the formula VI (VI)

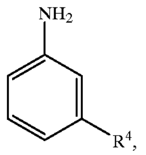

where $R^4$ is as defined above.

The resulting polyazo dye can then be coupled with the product of the reaction between the tetrazonium salt resulting from the sulfonyl compound IVb and the monoazo dye III.

The novel polyazo dyes of the formula I are advantageously suitable for dyeing natural or synthetic substrates, for example wool, leather, polyamide or paper (for example by means of the inkjet process). They are particularly suitable for dyeing leather.

The dyeings obtained have greenish to reddish blue hues and good migration and wet fastness properties.

The novel dyes can be used not only alone but also mixed with one another or with other dyes, especially with C.I. Acid Black 210.

The examples which follow are intended to illustrate the invention.

and 40 ml of 23% strength by weight aqueous sodium nitrite solution were added. The resulting suspension was stirred in 300 ml of water and 40 ml of concentrated hydrochloric acid and then subsequently stirred at 40–45° C. for 4 hours. Excess nitrous acid was then destroyed.

b) 38.35 g of 83.2% strength by weight aqueous 1-amino-8-hydronaphthalene-3,5-disulfonic acid were dissolved in 150 ml of water with sodium hydroxide solution at a pH of 6.0–6.5. This solution was then added dropwise over the course of 90 minutes to the diazonium salt suspension described under a) and coupling was carried out at 30–40° C. The reaction mixture was subsequently stirred overnight.

c) 26.5 g of the diazo component of the formula

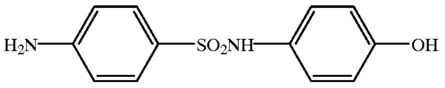

were suspended in a conventional manner with 50 ml of 18.5% strength by weight hydrochloric acid, and the mixture was cooled with ice to −2° C. and then tetrazotized at 0–5° C. using 31 ml of 23% strength by weight aqueous sodium nitrite solution. Stirring was carried out subsequently for 1 hour, excess nitrous acid was destroyed, and the tetrazonium salt solution was run over the course of 1 hour into the reaction mixture described under b) at a rate such that the pH was maintained continuously at >4–7.5 (addition of sodium hydrogen carbonate), giving a blue dye of the formula

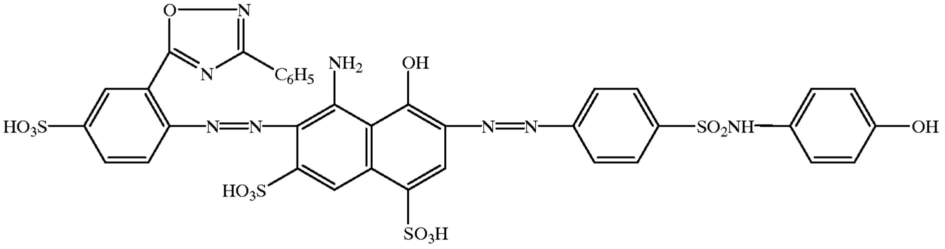

EXAMPLE 1 a) 32.8 g of the diazo component of the formula

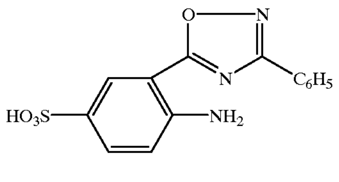

were dissolved in 250 ml of water at 80° C. with sodium hydroxide solution at a pH of 11–11.5. 1.5 g of a dispersant d) 18.4 g of the diazo component of the formula

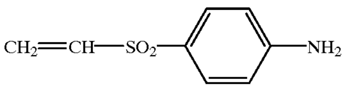

were diazotized in a conventional manner with 35 ml of concentrated hydrochloric acid, ice and 31 ml of 23% strength by weight aqueous sodium nitrite solution. Following the destruction of excess nitrite, the solution obtained was added to 31.9 g of a 10% strength by weight aqueous, freshly prepared suspension of 1-amino-8- hydroxynaphthalene-3,6-disulfonic acid with a pH of 0.8–1.0. Coupling of the mixture was allowed to proceed to completion overnight. Then 26.4 g of the tetrazo component of the formula

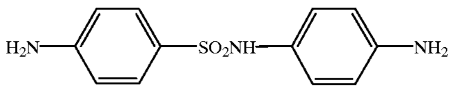

were tetrazotized in a manner known per se at 0–5° C. with hydrochloric acid and sodium nitrite. The resulting tetrazonium salt solution was run at a pH of from >5 to not more than 9 into the reaction mixture described above under d) and coupled to give the disazo dye of the formula

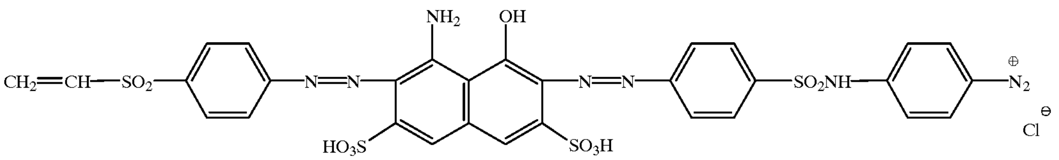

e) The blue coupling product described under c) was dissolved with sodium hydroxide solution at a pH of 10.5–11. The reaction mixture described under d) was run into this solution over the course of 1 hour at a pH of ≧10.5–11 and at 5–10° C., and the pH was held at this level. After coupling to completion, a navy dye of the formula

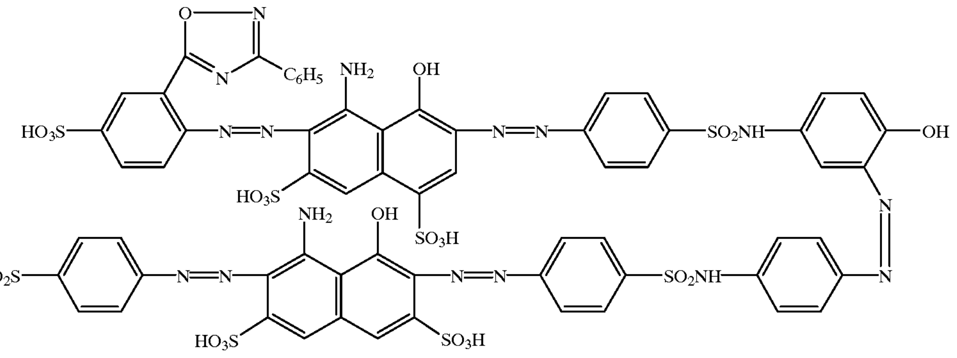

was present. Precipitation with potassium chloride at a pH of 1–4, filtration with suction and drying of the product gave 175 g of dye containing about 65 g of sodium chloride, potassium chloride and about 2.5% by weight of water. The dye dissolves in water with a reddish blue hue and dyes wool and leather in a blue to navy shade with very good fastness properties.

EXAMPLE 2

78.7 g of the dye of the formula

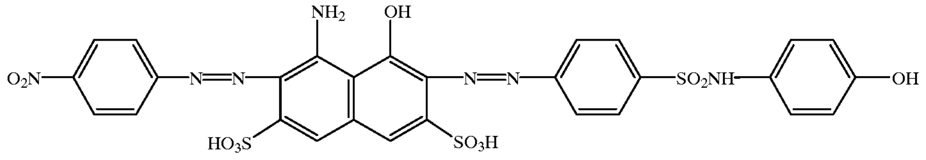

were suspended in 250 ml of water and the suspension was adjusted with sodium hydroxide solution to a pH of 10.5–11.0. 91.3 g of the diazonium salt of the formula

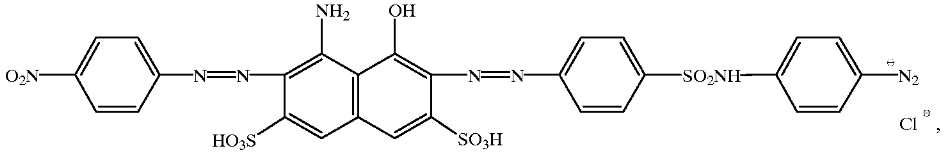

which was prepared by a method known per se, were added dropwise in the form of an aqueous suspension to this mixture at 20–25° C., over the course of 1.5 hours, at a rate such that the pH of the reaction mixture was held at 10.5–11 with sodium carbonate. The mixture was subsequently stirred overnight at 20–25° C. and at a pH of 10.2–11.0. It was then heated to 75° C., and the dye of the formula

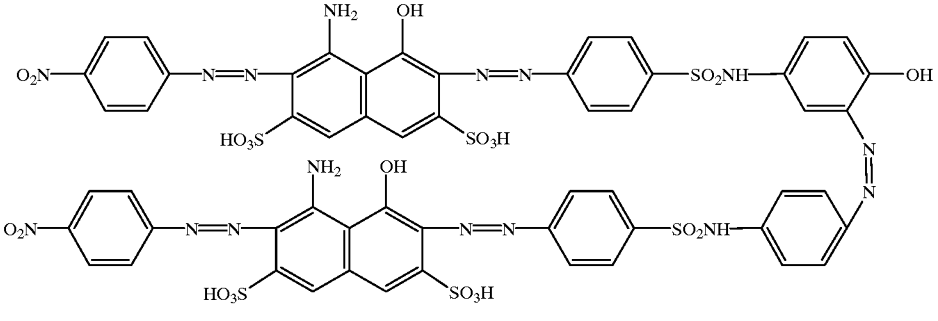

was precipitated with hydrochloric acid at a pH of <5–0.5. Filtration with suction and drying of the product gave 220 g of a black powder which contained about 30 g of salt and 10 g of water.

The dye dissolves in water with a blue hue and dyes wool in a wet-fast reddish blue to navy shade. The strong, reddish blue dyeings obtained on leather are also wetfast and have excellent migration fastness and good light fastness.

The absorption spectrum of a solution in aqueous acetic acid shows a maximum at 594 nm and a minimum at 430 nm.

The dyes listed below are obtained analogously.

TABLE 1
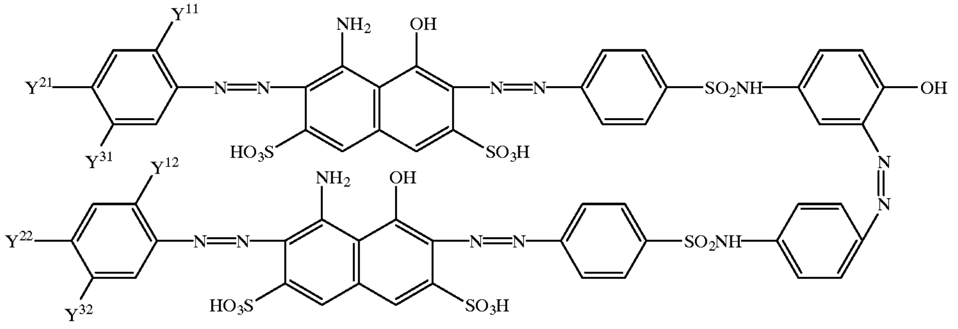
| Ex. No. | $Y^{11}$ | $Y^{21}$ | $Y^{31}$ | $Y^{12}$ | $Y^{22}$ | $Y^{32}$ |
|---|---|---|---|---|---|---|
| 3 | H | $SO_2OC_6H_5$ | H | H | $NO_2$ | H |
| 4 | H | $NO_2$ | H | H | $SO_2OC_6H_5$ | H |
| 5 | $SO_2C_6H_5$ | H | H | H | $NO_2$ | H |
| 6 | $SO_2C_6H_5$ | H | H | $SO_2C_6H_5$ | H | H |
| 7 | $SO_2C_6H_5$ | H | $SO_3H$ | $SO_2C_6H_5$ | H | H |
| 8 | 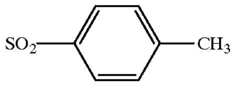 | H | $SO_3H$ | $SO_2C_6H_5$ | H | H |
| 9 | 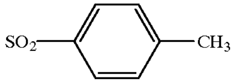 | H | $SO_2CH_3$ | 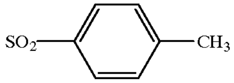 | H | H |
| 10 | 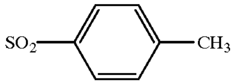 | H | H |  | H | $SO_2CH_3$ |

TABLE 1-continued
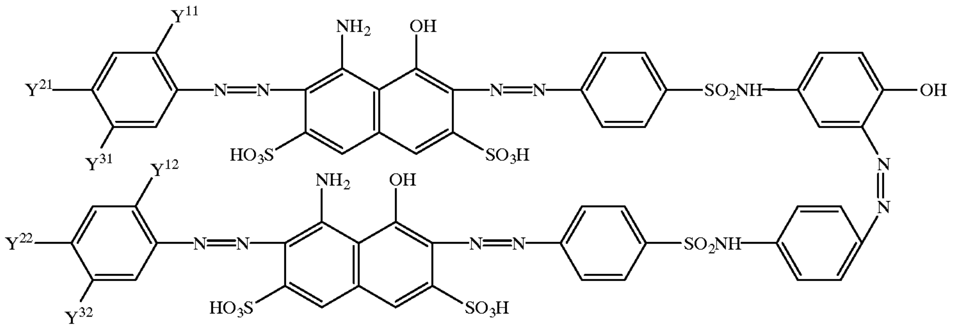
| Ex. No. | $Y^{11}$ | $Y^{21}$ | $Y^{31}$ | $Y^{12}$ | $Y^{22}$ | $Y^{32}$ |
|---|---|---|---|---|---|---|
| 11 | 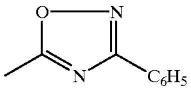 | $SO_3H$ | H | H | $NO_2$ | H |
| 12 | 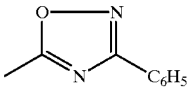 | $SO_3H$ | H | $SO_2C_6H_5$ | H | $SO_2CH_2CO_2H$ |
| 13 | 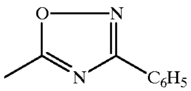 | $SO_3H$ | H | 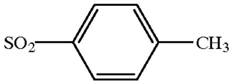 | H | $SO_2CH_3$ |
| 14 | H | $SO_2CH_2CH_2OH$ | H | H | $NO_2$ | H |
| 15 | H | $SO_2CH{=}CH_2$ | H | H | $NO_2$ | H |
| 16 | H | $SO_2CH{=}CH_2$ | H | H | $SO_2CH{=}CH_2$ | H |
| 17 | H | H | $SO_2CH{=}CH_2$ | H | $SO_2CH{=}CH_2$ | H |
| 18 | H | $NO_2$ | H | H | $SO_2CH{=}CH_2$ | H |
| 19 | H | $NO_2$ | H | H | H | $SO_2CH{=}CH_2$ |
| 20 | H | $SO_2C_6H_5$ | H | H | $NO_2$ | H |
| 21 | H | 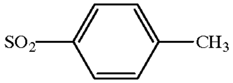 | H | H | $NO_2$ | H |
| 22 | H | $SO_2OC_6H_5$ | H | H | $SO_2CH{=}CH_2$ | H |
| 23 | H | $NO_2$ | H | H | $SO_2C_6H_5$ | H |

TABLE 1-continued
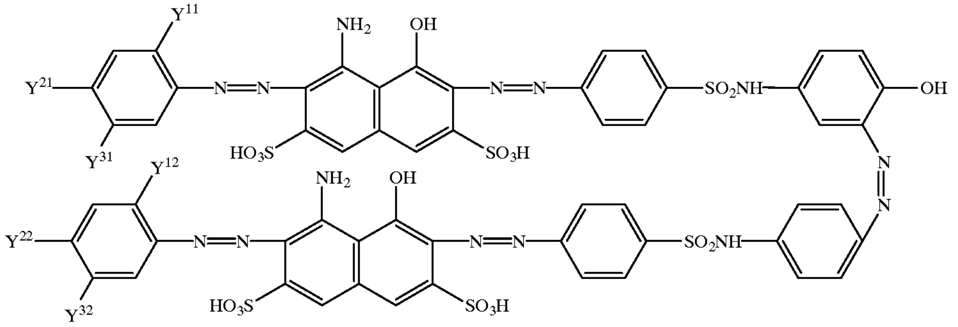
| Ex. No. | $Y^{11}$ | $Y^{21}$ | $Y^{31}$ | $Y^{12}$ | $Y^{22}$ | $Y^{32}$ |
|---|---|---|---|---|---|---|
| 24 | H | $NO_2$ | H | H | 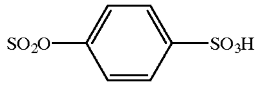 | H |
| 25 | H | $NO_2$ | H | H | 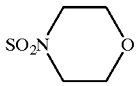 | H |
| 26 | H | $NO_2$ | H | H | $SO_2N(C_2H_4OH)_2$ | H |
| 27 | H | 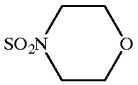 | H | H | $NO_2$ | H |
| 28 | H | $SO_2N(C_2H_4OH)_2$ | H | H | $NO_2$ | H |
| 29 | 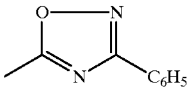 | $SO_3H$ | H | H | $SO_2CH{=}CH_2$ | H |
| 30 | 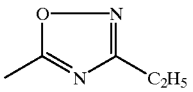 | $SO_3H$ | H | H | $SO_2CH{=}CH_2$ | H |

TABLE 1-continued
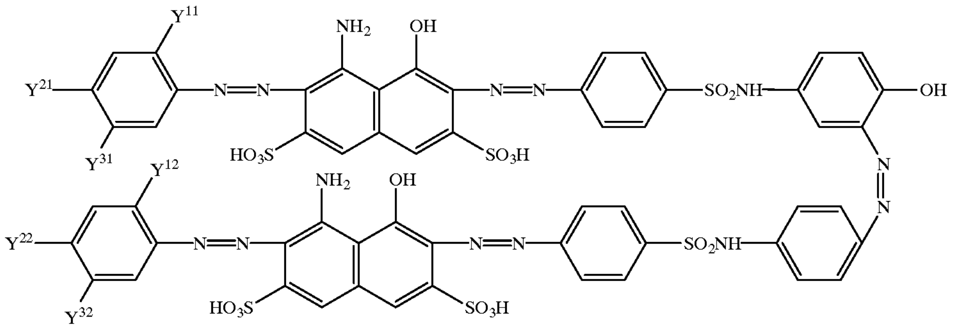
| Ex. No. | $Y^{11}$ | $Y^{21}$ | $Y^{31}$ | $Y^{12}$ | $Y^{22}$ | $Y^{32}$ |
|---|---|---|---|---|---|---|
| 31 | $COC_6H_5$ | $SO_3H$ | H | H | $SO_2CH{=}CH_2$ | H |
| 32 | 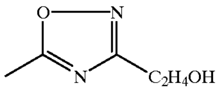 | H | H | H | $SO_2CH{=}CH_2$ | H |
| 33 | 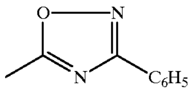 | $SO_3H$ | H | H | H | $SO_2CH{=}CH_2$ |
| 34 | H | $SO_2CH{=}CH_2$ | H | 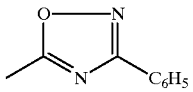 | $SO_3H$ | H |
| 35 | H | H | $SO_2CH{=}CH_2$ | 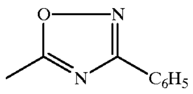 | $SO_3H$ | H |
| 36 | $SO_3H$ | $SO_2N(C_2H_5)_2$ | H | H | $NO_2$ | H |

TABLE 1-continued
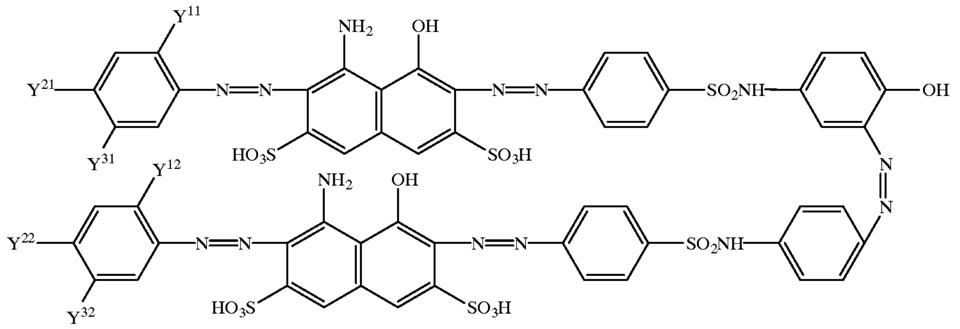
| Ex. No. | $Y^{11}$ | $Y^{21}$ | $Y^{31}$ | $Y^{12}$ | $Y^{22}$ | $Y^{32}$ |
|---|---|---|---|---|---|---|
| 37 | $SO_3H$ | $SO_2N(C_2H_5)_2$ | H | H | $SO_2CH{=}CH_2$ | H |
| 38 | $SO_3H$ | $SO_2C_6H_5$ | H | H | $SO_2CH{=}CH_2$ | H |
| 39 | H | $SO_2CH{=}CH_2$ | H | $SO_3H$ | $SO_2C_6H_5$ | H |
| 40 | $SO_2C_6H_5$ | H | H | H | $SO_2CH{=}CH_2$ | H |
| 41 | H | 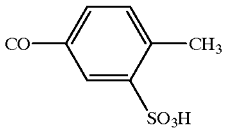 | H | H | $SO_2CH{=}CH_2$ | H |

TABLE 2
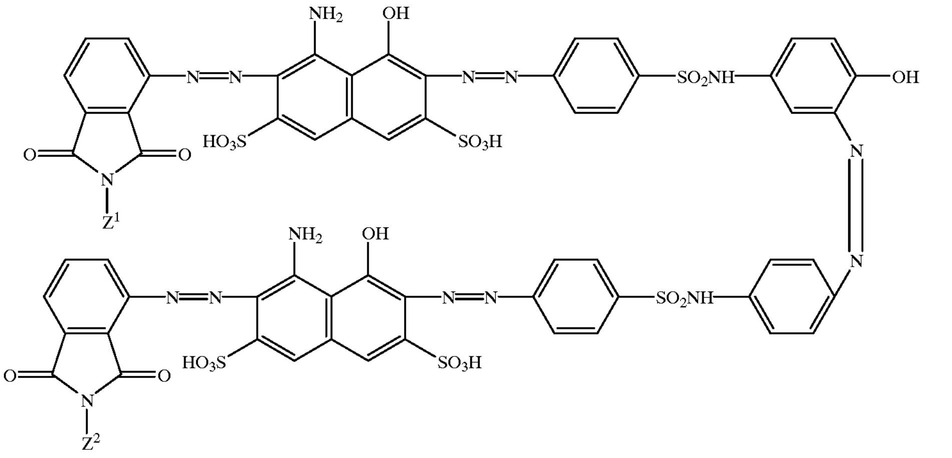
| Ex. No. | $Z^1$ | $Z^2$ |
| --- | --- | --- |
| 42 | $C_2H_5$ | $C_2H_5$ |
| 43 | $C_2H_4OH$ | $C_2H_4OH$ |
| 44 | $C_2H_5$ | $C_2H_4OH$ |
| 45 | $C_4H_9$ | $C_4H_9$ |
| 46 | $C_2H_4OH$ | $C_4H_9$ |
| 47 | 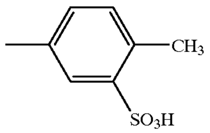 | $C_4H_9$ |
| 48 | $C_4H_9$ | $C_2H_4OC_2H_4OH$ |
TABLE 3
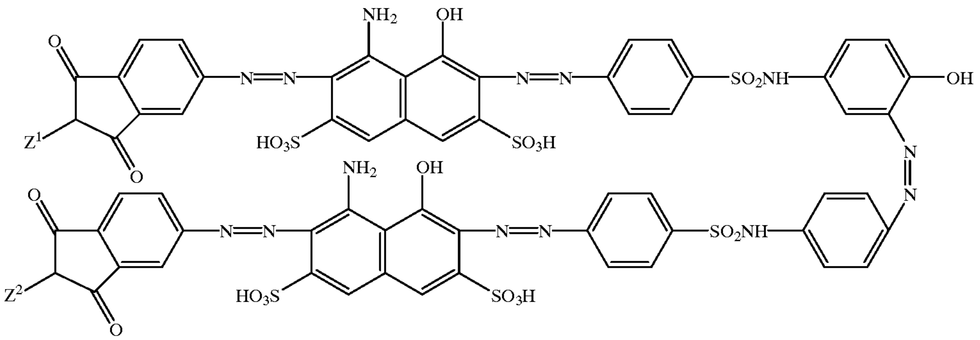
| Ex. No. | $Z^1$ | $Z^2$ |
| --- | --- | --- |
| 49 | $C_2H_5$ | $C_2H_5$ |
| 50 | $C_2H_4OH$ | $C_2H_4OH$ |
| 51 | $C_2H_5$ | $C_2H_4OH$ |
| 52 | $C_4H_9$ | $C_4H_9$ |
| 53 | $C_2H_4OH$ | $C_4H_9$ |
| 54 | 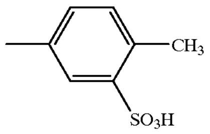 | $C_4H_9$ |
| 55 | $C_4H_9$ | $C_2H_4OC_2H_4OH$ |

TABLE 3-continued
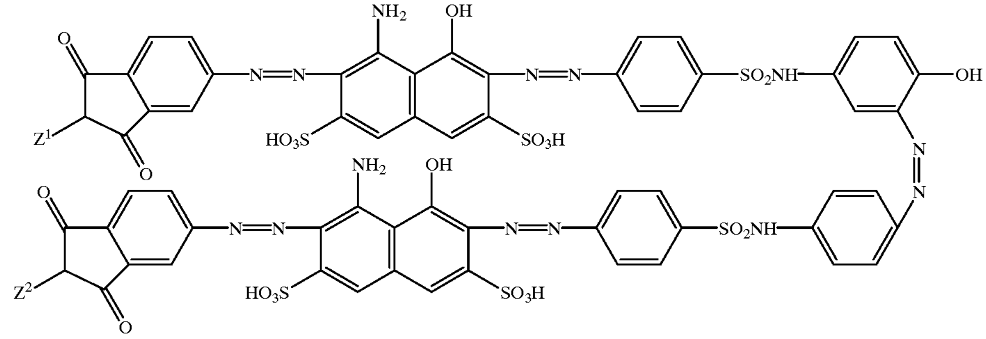
| Ex. No. | $Z^1$ | $Z^2$ |
|---|---|---|
| 56 | $C_2H_4OC_2H_4OH$ | $C_4H_9$ |
| 57 | $CH(CH_3)_2$ | $C_2H_5$ |
| 58 | 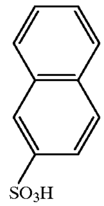 | $C_2H_5$ |
TABLE 4
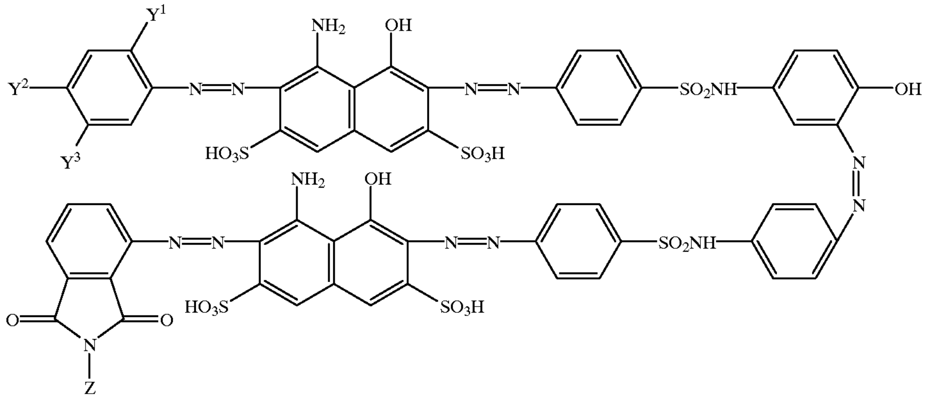
| Ex. No. | $Y^1$ | $Y^2$ | $Y^3$ | Z |
|---|---|---|---|---|
| 59 | H | $NO_2$ | H | $C_2H_4OH$ |
| 60 | H | $SO_2OC_6H_5$ | H | $C_2H_4OH$ |
| 61 | H | $SO_2CH{=}CH_2$ | H | $C_2H_4OH$ |
| 62 | $SO_2C_6H_5$ | H | H | $C_2H_4OC_2H_4OH$ |
| 63 | 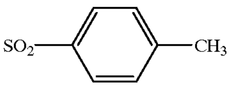 | H | $SO_3H$ | 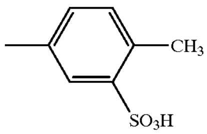 |
| 64 | $SO_3H$ | $SO_2N(C_2H_5)_2$ | H | $C_2H_4OH$ |
| 65 | $COC_6H_5$ | H | H | $C_2H_4OH$ |

TABLE 4-continued
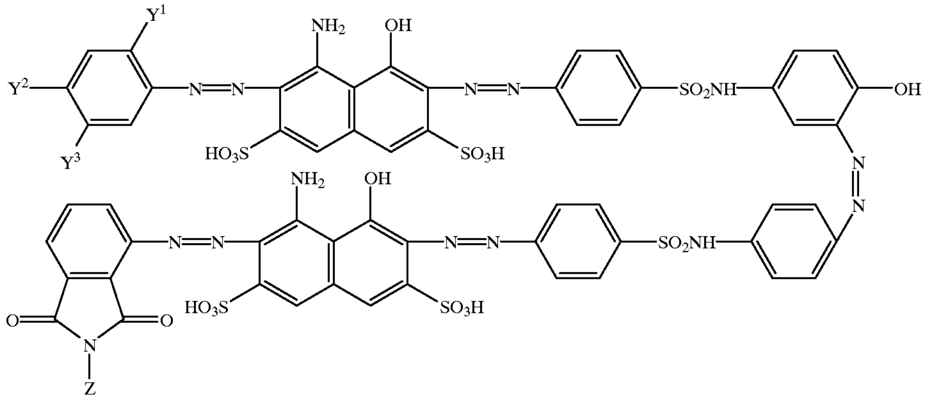
| Ex. No. | $Y^1$ | $Y^2$ | $Y^3$ | Z |
|---|---|---|---|---|
| 66 | H | 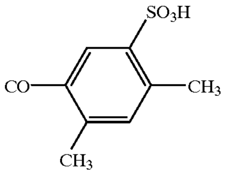 | H | $C_4H_9$ |
| 67 | H | $NO_2$ | H | $C_4H_9$ |
| 68 | H | $NO_2$ | H | $C_2H_5$ |
TABLE 5
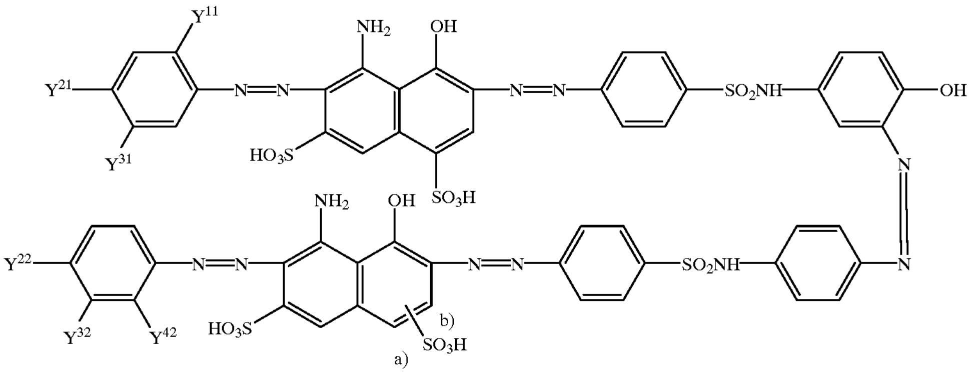
| Ex. No. | $Y^{11}$ | $Y^{21}$ | $Y^{31}$ | $Y^{42}$ | $Y^{32}$ | $Y^{22}$ | Position of $SO_3H$ |
|---|---|---|---|---|---|---|---|
| 69 | H | $NO_2$ | H | H | H | $NO_2$ | a |
| 70 | H | $NO_2$ | H | H | H | $NO_2$ | b |
| 71 | 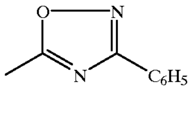 | $SO_3H$ | H | H | H | $SO_2CH{=}CH_2$ | a |
| 72 | 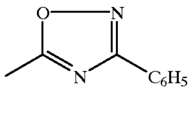 | $SO_3H$ | H | H | H | $SO_2CH{=}CH_2$ | b |
| 73 | $SO_2C_6H_5$ | H | $SO_3H$ | H | H | $SO_2CH{=}CH_2$ | a |
| 74 | $SO_2C_6H_5$ | H | $SO_3H$ | H | H | $SO_2CH{=}CH_2$ | b |
| 75 | $SO_2C_6H_5$ | $SO_3H$ | H | H | H | $SO_2CH{=}CH_2$ | b |

TABLE 5-continued
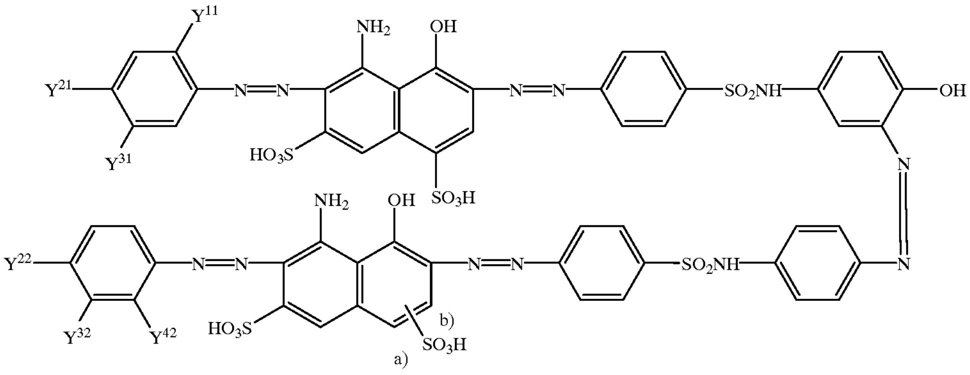
| Ex. No. | $Y^{11}$ | $Y^{21}$ | $Y^{31}$ | $Y^{42}$ | $Y^{32}$ | $Y^{22}$ | Position of $SO_3H$ |
|---|---|---|---|---|---|---|---|
| 76 | H | $NO_2$ | H | | 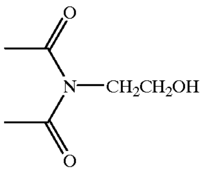 | H | a |
| 77 | H | $NO_2$ | H | | 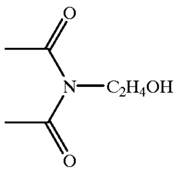 | H | b |
| 78 | H | $NO_2$ | H | H | 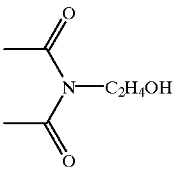 | | b |
| 79 | H | $SO_2CH{=}CH_2$ | H | H | H | $SO_2CH{=}CH_2$ | b |
| 80 | H | $SO_2CH{=}CH_2$ | H | H | H | $SO_2CH{=}CH_2$ | a |
| 81 | H | $NO_2$ | H | H | 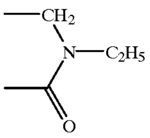 | | b |

TABLE 6

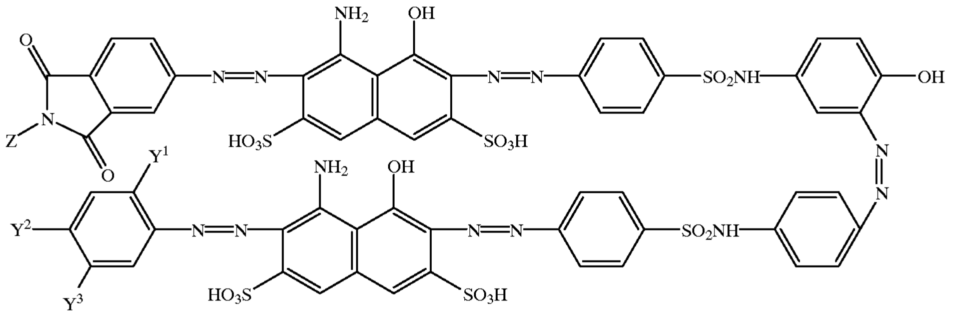

| Ex. No. | $Y^1$ | $Y^2$ | $Y^3$ | Z |
|---|---|---|---|---|
| 82 | H | $NO_2$ | H | $C_2H_5$ |
| 83 | H | $NO_2$ | H | $C_4H_9$ |
| 84 | H | $NO_2$ | H | $C_2H_4OH$ |
| 85 | H | $SO_2CH{=}CH_2$ | H | $C_2H_4OH$ |
| 86 | H | $SO_2CH{=}CH_2$ | H | $C_2H_5$ |
| 87 | H | $SO_2CH_2CH_2OH$ | H | $C_2H_5$ |
| 88 | $SO_2C_6H_5$ | H | H | $C_2H_4OH$ |
| 89 | 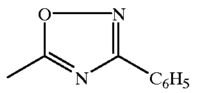 | $SO_3H$ | H | $C_2H_5$ |
| 90 | 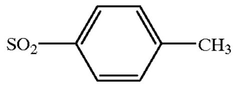 | H | $SO_3H$ | $C_2H_5$ |
| 91 | H | $SO_2N(C_2H_5)_2$ | H | $C_2H_4OH$ |
| 92 | H | 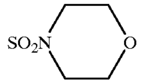 | H | $C_2H_4OH$ |
| 93 | $SO_3H$ | $SO_2N(C_2H_5)_2$ | H | $C_2H_5$ |

EXAMPLE 94

29.9 g of 4-phenoxysulfonylaniline were stirred up overnight in 100 ml of concentrated hydrochloric acid. Then 100 g of ice/water and 2 g of an acidic wetting agent were added and the mixture was cooled to 0° C. After this, 37.5 ml of 23% strength by weight aqueous sodium nitrite solution were added dropwise and the mixture was subsequently stirred at 0–5° C. for 30 minutes. Excess nitrous acid was then destroyed and 46 g of 83.2% strength by weight monosodium 1-aminohydroxynaphthalene-3,6-disulfonate, which was dissolved freshly in water at a pH of 6.5, were run in. The pH of the reaction mixture was then raised to 2 with sodium bicarbonate and the mixture was subsequently stirred at this pH for 90 minutes, and subsequently stirred overnight at room temperature. The red dye of the formula

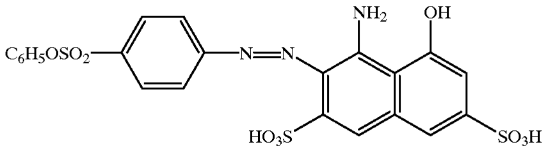

was coupled with the equivalent quantity of the tetrazonium salt of the formula

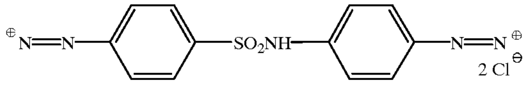

in a conventional manner at a pH of 8.5–10. The resulting blue diazonium salt of the formula

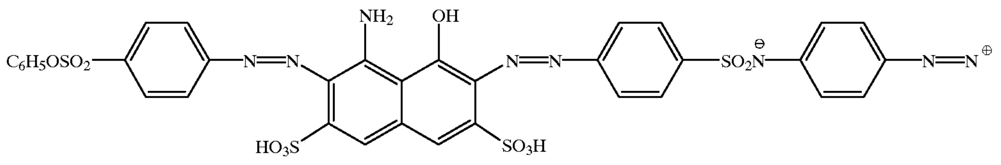

was coupled at a pH of 7.5–10 with m-phenylenediamine, to give the dye of the formula

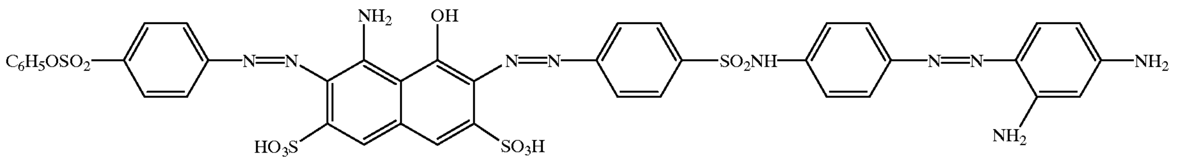

The VIS spectrum of this dye (dissolved at pH 4 in water) shows absorption maxima at 475 and 597 nm and a minimum at about 568 nm.

EXAMPLE 95

The dye solution obtained in Example 94 was admixed at room temperature with the equivalent quantity of the diazo component of the formula The dye dyes leather dark blue and penetrates deep into the tissue of the leather, while the dye of Example 94 produces strong black dyeings with good fastness properties on leather.

EXAMPLE 96

The procedure of Example 94 was repeated but using 29.6 g of 4-aminodiphenyl sulfone, giving first the dye of the formula

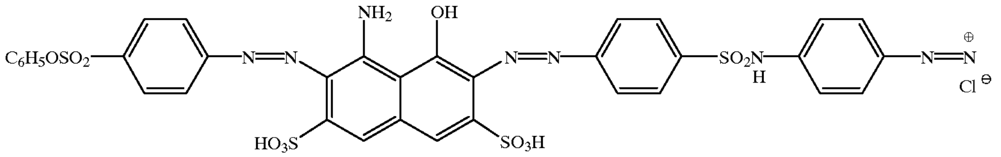

(prepared by analogy with Example 94) and coupling was carried out at a pH of 10.3–10.5. The resulting dye was precipitated at a pH of 6 and then filtered off with suction. Drying gave 161 g of the dye of the formula

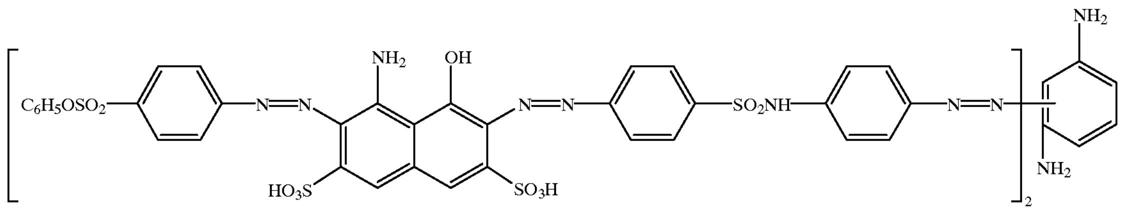

The VIS spectrum (range >350 nm) shows a maximum at 587 nm (at pH 4 and likewise at pH 10).

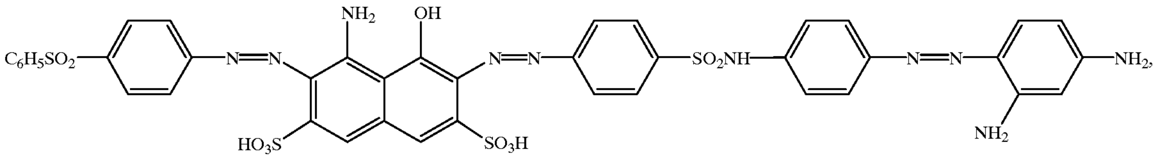

which dyes leather in deep black shades; λ max (in $H_2O$) at pH 4:595 nm.

When the diazo component of the formula

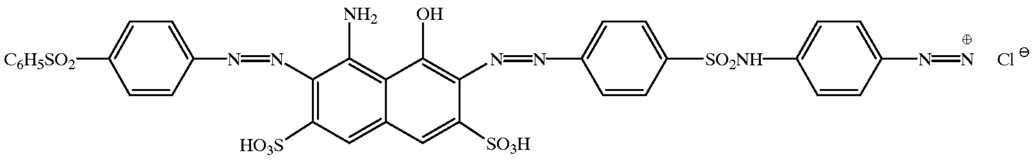

was coupled with this dye at a pH of 10–10.8, the resulting polyazo dye had the formula

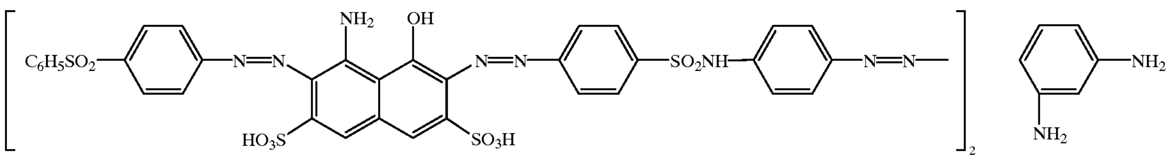

and also contained a small quantity of the dye of the formula

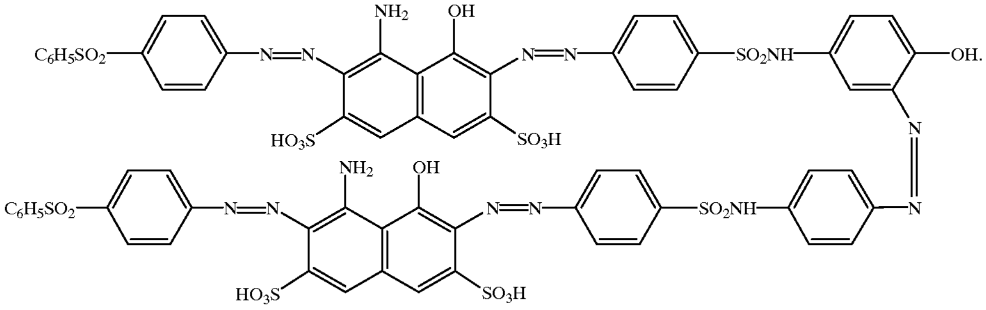

Dissolved in water at a pH of 4, the mixture has the following UV-VIS spectrum:

λ max=485 nm and 591 nm.

The dye dyes leather in a gray shade.

EXAMPLE 97

29.1 g of the diazo component of the formula

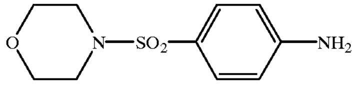

were diazotized as in Example 94 and coupled with 46 g of 83% strength by weight monosodium 1-amino-8-hydroxynaphthalene-3,6-disulfonate. The resulting red dye of the formula

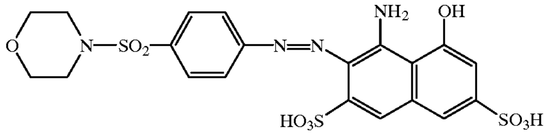

was admixed with 0.12 mol of the tetrazonium salt of the formula

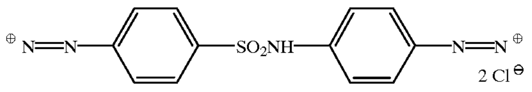

and coupling was carried out with a pH of 7–10 to give the blue diazonium salt of the formula

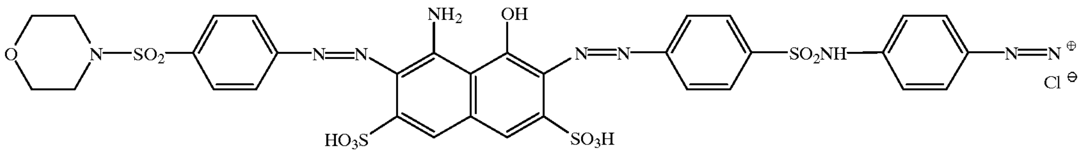

Then 12.7 g of m-phenylenediamine were added and coupling was carried out at a pH of 9.5 to give the dye of the formula

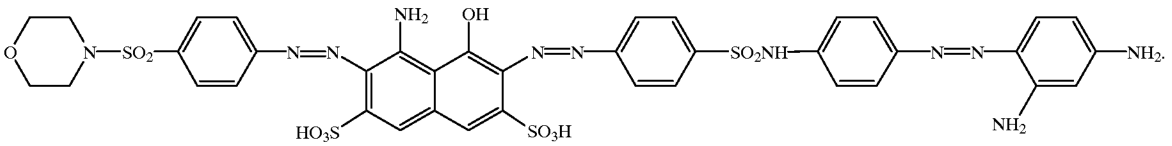

The resulting green dye solution was admixed with 0.12 mol of the diazonium salt of the formula

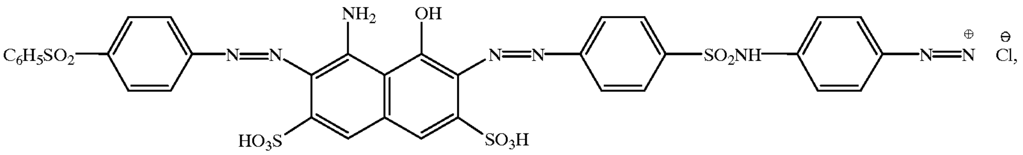

whose preparation is described in Example 96, and coupling was carried out at a pH of 10–11 to give the dye of the formula

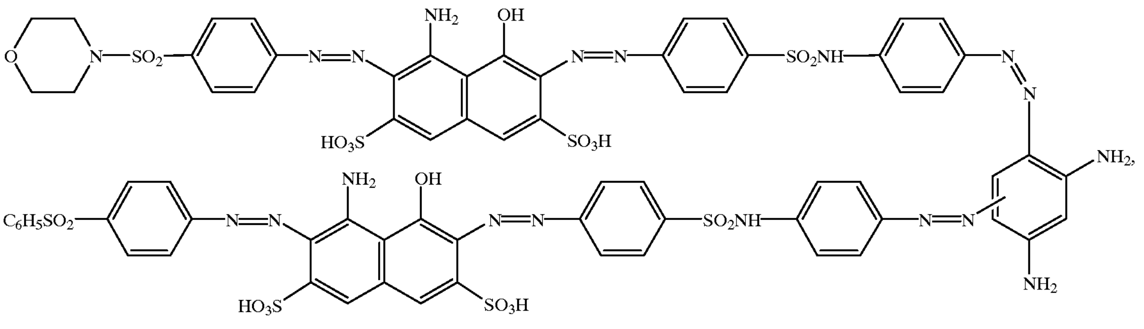

a blue-black dye which dyes leather in a fast dark blue shade.

The dyes indicated in the Tables below are obtained analogously.
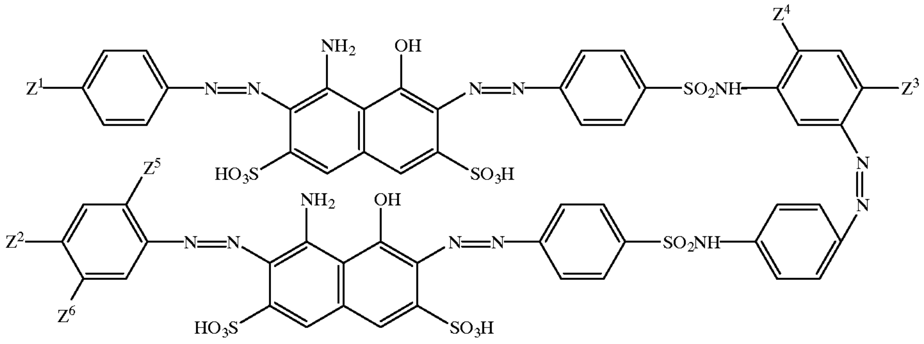
| Ex. No. | $Z^1$ | $Z^2$ | $Z^3$ | $Z^4$ | $Z^5$ | $Z^6$ | Hue |
|---|---|---|---|---|---|---|---|
| 98 | $C_6H_5SO_2$ | $NO_2$ | $NH_2$ | $NH_2$ | H | H | blue-green |
| 99 | $C_6H_5SO_2$ | $NO_2$ | $NH_2$ | $NH_2$ | H | $SO_3H$ | blue |
| 100 | 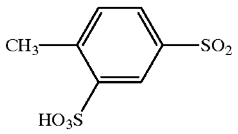 | $NO_2$ | $NH_2$ | $NH_2$ | H | H | blue |
| 101 | $C_2{=}CHSO_2$ | $C_6H_5SO_2$ | $NH_2$ | $NH_2$ | H | H | blue-gray |
| 102 | 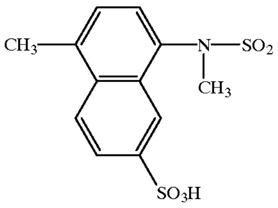 | $NO_2$ | $NH_2$ | $NH_2$ | H | H | blue-gray |

-continued
The dyes indicated in the Tables below are obtained analogously.
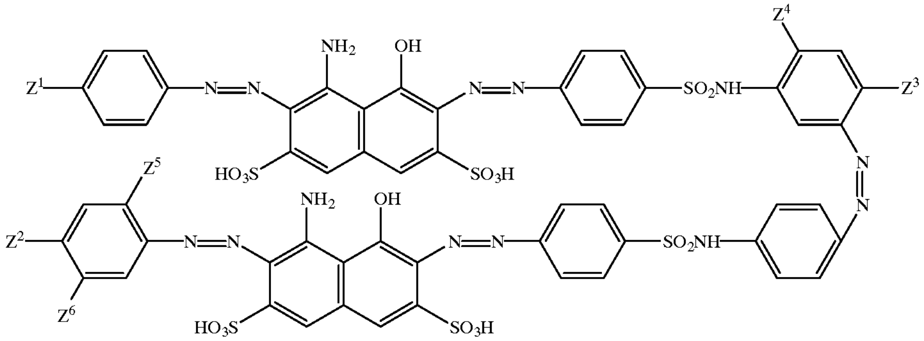
| Ex. No. | $Z^1$ | $Z^2$ | $Z^3$ | $Z^4$ | $Z^5$ | $Z^6$ | Hue |
|---|---|---|---|---|---|---|---|
| 103 | 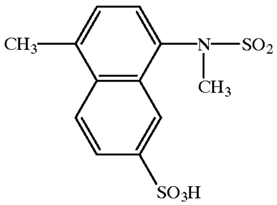 | $NO_2$ | OH | $NH_2$ | H | H | cloudy blue |
| 104 | $NO_2$ | $CH_2{=}CHSO_2$ | OH | $NH_2$ | H | H | cloudy blue |
| 105 | $NO_2$ | H | $NH_2$ | $NH_2$ | $C_6H_5SO_2$ | H | blue-gray |
| 106 | 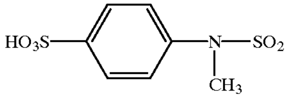 | $NO_2$ | $NH_2$ | $NH_2$ | H | H | blue-gray |
| 107 | $CH{=}CHSO_2$ | $NO_2$ | OH | $NH_2$ | H | H | blue-gray |
| 108 | $CH_2{=}CHSO_2$ | 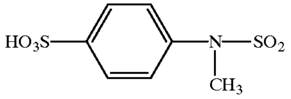 | $NH_2$ | $NH_2$ | H | H | blue-gray |
| 109 | $CH_2{=}CHSO_2$ | H | $NH_2$ | $NH_2$ | $C_6H_5SO_2$ | H | blue-gray |

-continued

The dyes indicated in the Tables below are obtained analogously.

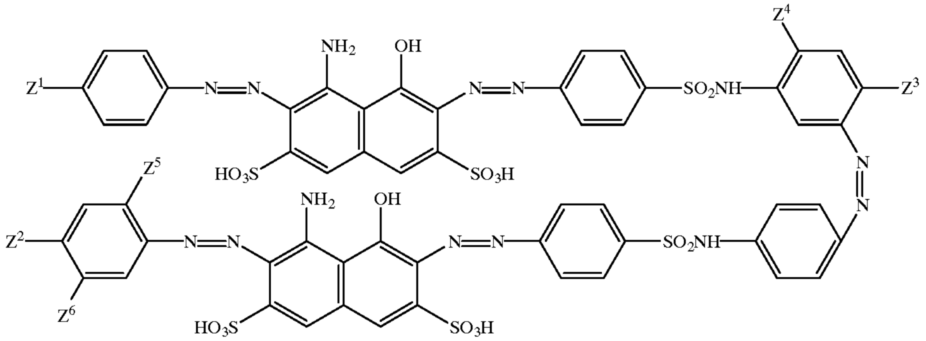

| Ex. No. | $Z^1$ | $Z^2$ | $Z^3$ | $Z^4$ | $Z^5$ | $Z^6$ | Hue |
|---|---|---|---|---|---|---|---|
| 110 | $CH_2{=}CHSO_2$ | H | $NH_2$ | $NH_2$ | $C_6H_5SO_2$ | $SO_3H$ | cloudy blue |
| 111 | $NO_2$ | H | $NH_2$ | $NH_2$ | $C_6H_5SO_2$ | $SO_3H$ | cloudy blue |
| 112 | $NO_2$ | H | $NH_2$ | OH | $C_6H_5SO_2$ | $SO_3H$ | cloudy blue |
| 113 | $NO_2$ | $SO_3H$ | $NH_2$ | $NH_2$ | $C_6H_5SO_2$ | H | cloudy blue |
| 114 | $NO_2$ | $C_6H_5SO_2$ | $NH_2$ | $NH_2$ | H | $SO_3H$ | gray-blue |
| 115 | $NO_2$ | $SO_3H$ | $NH_2$ | $NH_2$ | 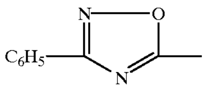 | H | gray-blue |
| 116 | $CH_2{=}CHSO_2$ | $SO_3H$ | $NH_2$ | $NH_2$ | 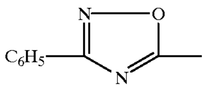 | H | gray-blue |
| 117 | $CH_2{=}CHCH_2SO_2$ | $SO_3H$ | $NH_2$ | $NH_2$ | 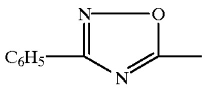 | H | gray-blue |
| 118 | $CH_2{=}CHSO_2$ | $SO_3H$ | $NH_2$ | $NH_2$ | $C_6H_5SO_2$ | H | gray-blue |

-continued
The dyes indicated in the Tables below are obtained analogously.
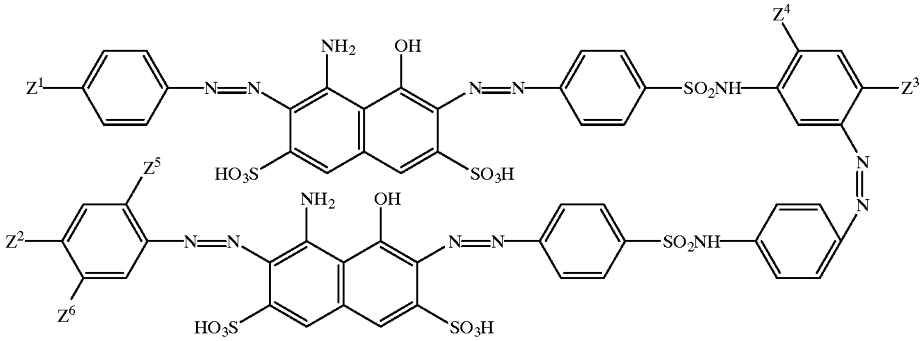
| Ex. No. | Z1 | $Z^2$ | $Z^3$ | $Z^4$ | $Z^5$ | $Z^6$ | Hue |
|---|---|---|---|---|---|---|---|
| 119 | $NO_2$ | $SO_3H$ | $NH_2$ | $NH_2$ | 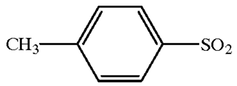 | H | gray-blue |
| 120 | $CH_2{=}CHSO_2$ | $SO_3H$ | $NH_2$ | $NH_2$ | $C_6H_5SO_2$ | H | gray-blue |
| 121 | $NO_2$ | $SO_3H$ | OH | $NH_2$ | $C_6H_5SO_2$ | H | gray-blue |
| 122 | $NO_2$ | $SO_3H$ | $NH_2$ | OH | $C_6H_5SO_2$ | H | gray-blue |

TABLE 6
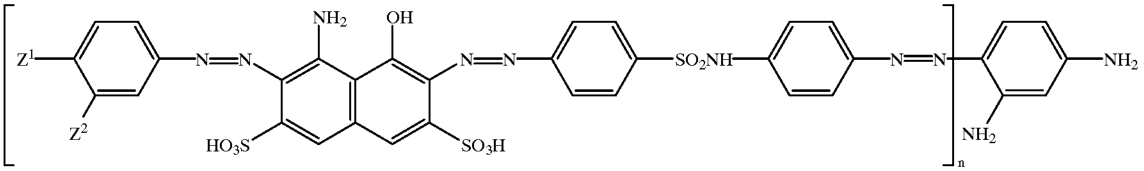
| Ex. No. | $Z^1$ | n | $Z^2$ | Hue on leather |
|---|---|---|---|---|
| 123 | 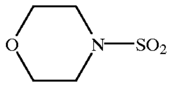 | 0 | H | black |
| 124 | $(CH_3OCH_2CH_2)NSO_2$ | 0 | H | black |
| 125 | 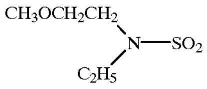 | 0 | H | black |
| 126 | 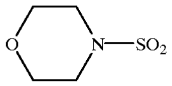 | 1 | H | dark blue |
| 127 | $(CH_3OCH_2CH_2)NSO_2$ | 1 | H | dark blue |
| 128 | 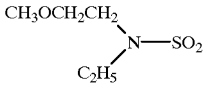 | 1 | H | dark blue |
| 129 | 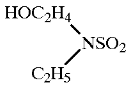 | 0 | H | black |
| 130 | 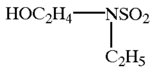 | 1 | H | black |
| 131 | 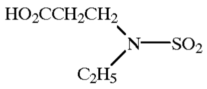 | 0 | H | black |
| 132 | 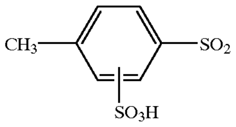 | 0 | H | black |
| 133 | $C_6H_5SO_2$ | 0 | $SO_3H$ | black |
| 134 | $O_2N$ | 1 | H | blue-gray*) |
*)$\lambda_{max}$ 593 nm (pH ~ 4, in water), shoulder at 500 nm

We claim:

1. A polyazo dye of the formula I (I)

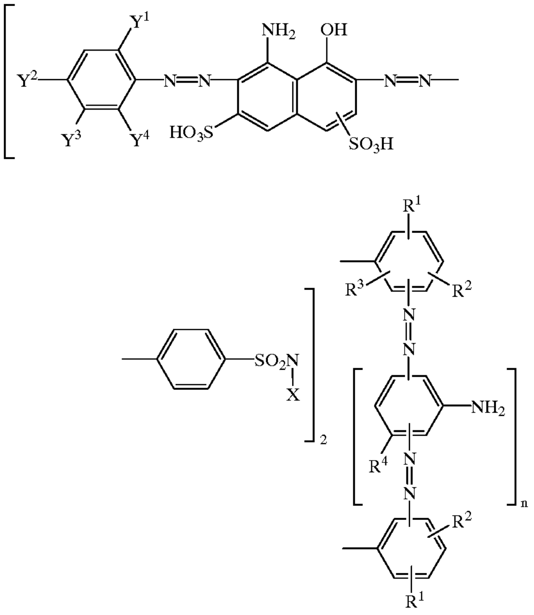

where n is 0 or 1, $Y^1$ is hydrogen, hydroxysulfonyl, pyrrolidinylsulfonyl, pi-peridinylsulfonyl, morpholinylsulfonyl or $SO_2$—Alk, $SO_2$—Ar, $SO_2$—N(Alk)$_2$, $SO_2$—N(Alk)Ar, $SO_2$—OAr, $SO_2$—$C_2H_4$—Q, $SO_2$—CH═$CH_2$, $SO_2$—$CH_2$CH═$CH_2$, CO—Ar,

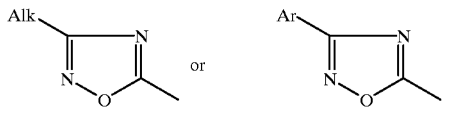

$Y^2$ is nitro, $SO_2$—NHAr or $Y^1$, $Y^3$ is hydrogen, hydroxysulfonyl, pyrrolidinylsulfonyl, piperidinylsulfonyl, morpholinylsulfonyl or a radical of the formula $SO_2$—Alk, $SO_2$—N(Alk)$_2$, $SO_2$—NHAlk, $SO_2$—$CH_2$COOH, $SO_2$—$C_2H_4$—Q, $SO_2$—CH═$CH_2$, $SO_2$—$CH_2$CH═$CH_2$, CO—Ar or C—NHAlk or $Y^3$ and $Y^2$ together are L—NZ—CO, $Y^4$ is hydrogen, or $Y^4$ and $Y^3$ together are L—NZ—CO, X is hydrogen or $C_1$–$C_4$-alkyl, $R^1$ is hydrogen, $C_1$–$C_4$-alkyl, halogen, carboxyl, $C_1$–$C_4$-alkoxycarbonyl or hydroxysulfonyl, $R^2$ is hydrogen, $C_1$–$C_4$-alkyl, halogen, carboxyl or $C_1$–$C_4$-alkoxycarbonyl, or $R^2$ and $R^1$ together are L—NZ—CO, $R^3$ is hydrogen, hydroxyl, $C_1$–$C_4$-alkoxy, $C_1$–$C_4$-alkanoyloxy or benzoyloxy, and $R^4$ is hydrogen, amino or hydroxyl, where Alk is $C_1$–$C_8$-alkyl which may be interrupted by 1–3 oxygens in ether function or by sulfur or sulfonyl and may be substituted by hydroxyl, $C_1$–$C_4$-alkanoyloxy, benzoyloxy, sulfato, halogen, cyano, carboxyl or phenyl, Ar is phenyl which may be substituted by $C_1$–$C_4$-alkyl, $C_1$–$C_4$-alkoxy, halogen, carboxyl, $C_1$–$C_4$-alkanoylamino or hydroxysulfonyl, L is methylene or carbonyl, Z is hydrogen, naphthyl, $C_5$–$C_8$-cycloalkyl, Alk or Ar, and Q is hydroxyl or a group which may be eliminated under alkaline conditions.

2. A polyazo dye as claimed in claim 1, of the formula Ia

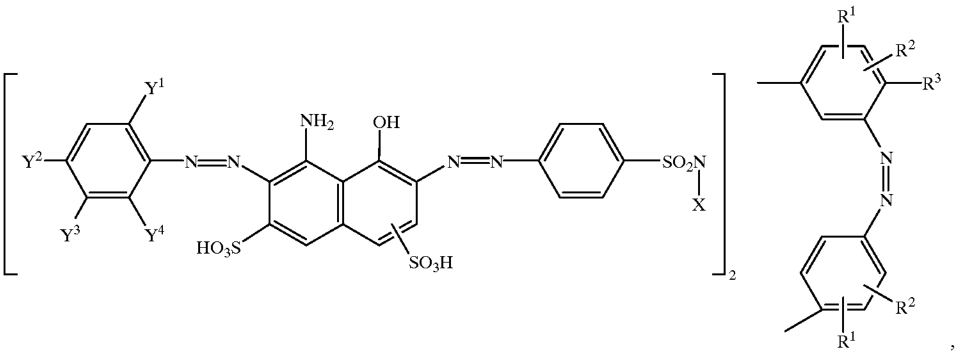

where $Y^1$, $Y^2$, $Y^3$, $Y^4$, X, $R^1$, $R^2$ and $R^3$ are each as defined in claim 1.

3. A polyazo dye as claimed in claim 1, of the formula Ib (Ib)

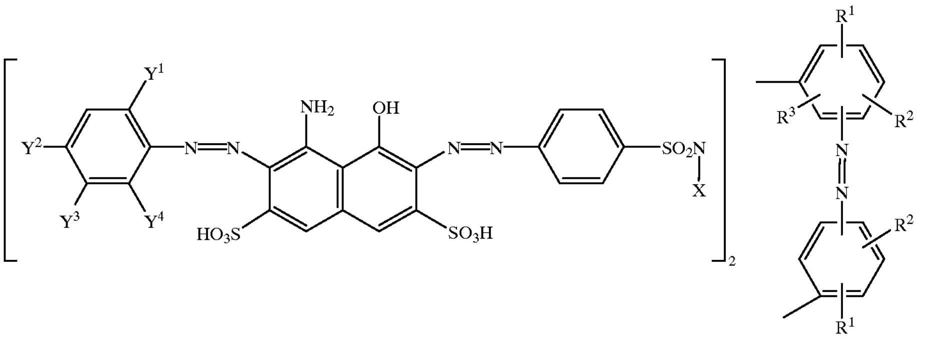

where $Y^1$, $Y^2$, $Y^3$, $Y^4_1$ X, $R^1$, $R^2$ and $R^3$ are each as defined in claim 1.

4. A polyazo dye as claimed in claim 1, wherein $R^1$ and $R^2$ are each hydrogen.

5. A polyazo dye as claimed in claim 1, wherein $R^3$ is hydroxyl.

6. A polyazo dye as claimed in claim 1, wherein X is hydrogen.

7. A polyazo dye as claimed in claim 1, wherein $Y^1$ is hydrogen, hydroxysulfonyl or

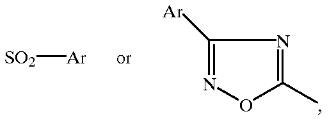

where each Ar is as defined in claim 1.

8. A polyazo dye as claimed in claim 1, wherein $Y^2$ is hydrogen, hydroxysulfonyl, nitro or $SO_2$—N(Alk)$_2$, $SO_2$—$C_2H_4$—Q or $SO_2$—CH═CH2, where Alk and Q are each as defined in claim 1.

9. A polyazo dye as claimed in claim 1, wherein $Y^3$ is hydrogen, hydroxysulfonyl or $SO_2$—$C_2H_4$—Q or $SO_2$—CH═$CH_2$, or $Y^3$ and $Y^2$ together are L—NZ—CO, where L, Q and Z are each as defined in claim 1.

10. A method of dyeing natural or synthetic substrates, which comprises applying to said substrates one or more polyazo dyes as claimed in claim 1.

* * * * *